(12) United States Patent
Salzer

(10) Patent No.: US 6,588,839 B1
(45) Date of Patent: Jul. 8, 2003

(54) PLANE PASSENGER SEAT WITH INTEGRATED LIFE VEST

(75) Inventor: Uwe Salzer, Salem (DE)

(73) Assignee: Recaro Aircraft Seating GmbH & Co., Schwäbisch Hall (DE)

( * ) Notice: Subject to any disclaimer, the term of this patent is extended or adjusted under 35 U.S.C. 154(b) by 0 days.

(21) Appl. No.: 10/069,784
(22) PCT Filed: Sep. 6, 2000
(86) PCT No.: PCT/EP00/08684
§ 371 (c)(1),
(2), (4) Date: Feb. 28, 2002
(87) PCT Pub. No.: WO01/21485
PCT Pub. Date: Mar. 29, 2001

(30) Foreign Application Priority Data

Sep. 17, 1999 (DE) ........................................ 199 44 619

(51) Int. Cl.[7] ................................................ A47C 7/62
(52) U.S. Cl. ............................. 297/217.1; 297/188.03; 244/122 R
(58) Field of Search ..................... 297/188.03, 217.1; 244/122 R, 118.5, 188.6

(56) References Cited

U.S. PATENT DOCUMENTS

| 3,167,794 A | 2/1965 | Brown |
|---|---|---|
| 3,623,683 A | 11/1971 | Bennett |
| 3,903,554 A | 9/1975 | Dodd |
| 4,619,623 A | 10/1986 | Elverskog |
| 4,819,987 A | 4/1989 | Stringer |
| 5,335,882 A | 8/1994 | Bonacci |
| 5,342,109 A | 8/1994 | Berry et al. |

FOREIGN PATENT DOCUMENTS

GB 2026853 2/1980

*Primary Examiner*—Anthony D. Barfield
(74) *Attorney, Agent, or Firm*—Roylance, Abrams, Berdo & Goodman, LLP.

(57) ABSTRACT

A plane passenger seat has a storage compartment for a life vest and upholstery elements that improve the sitting comfort. The storage compartment is made up of at least one upholstery element. The life vest is received by the corresponding upholstery element as an integral part thereof. In this manner, the corresponding upholstery is replaced by the life vest so that the weight of the seat is reduced compared to conventional seats, thereby allowing potentially higher load capacities.

12 Claims, 2 Drawing Sheets

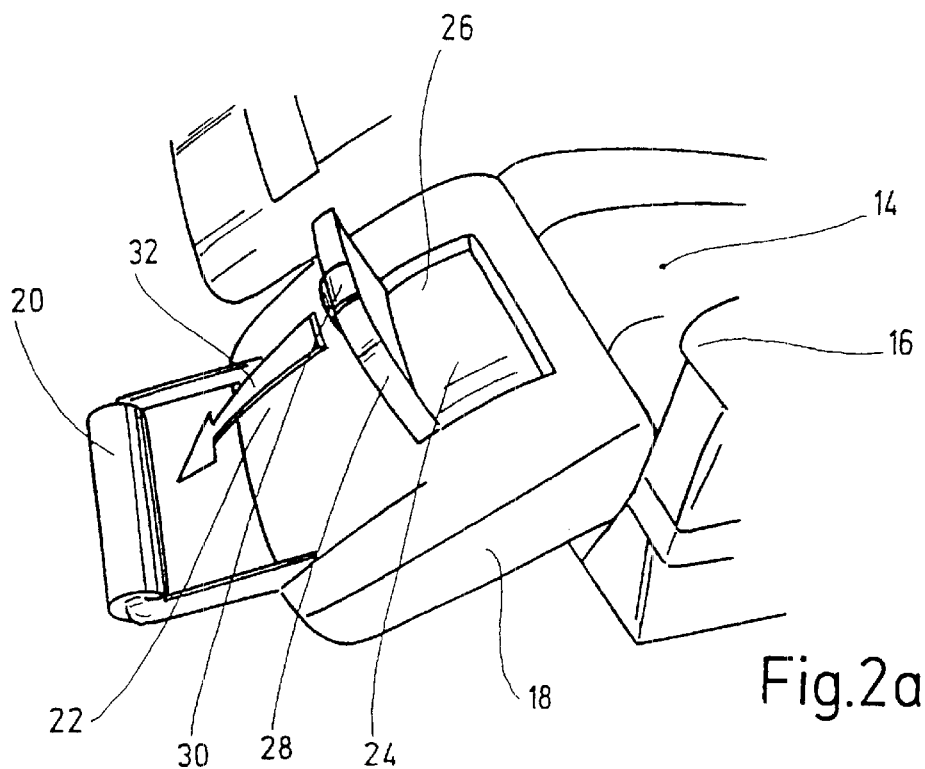
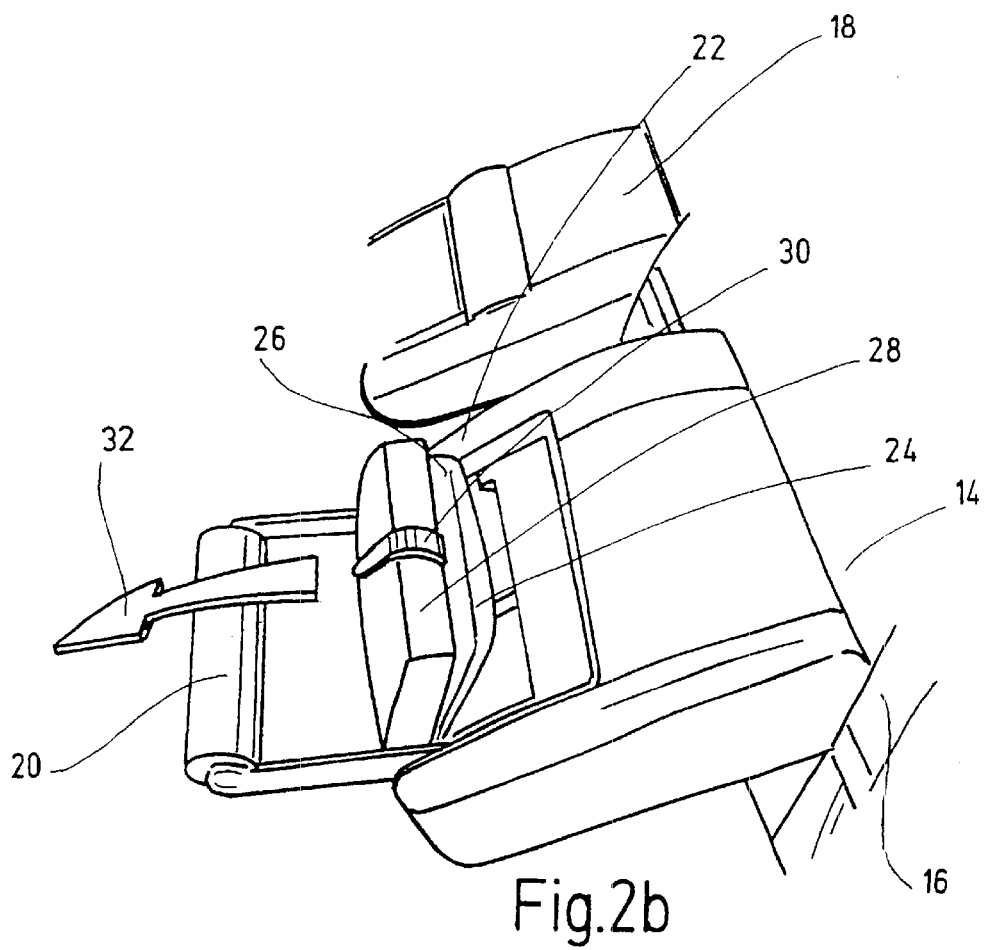

PLANE PASSENGER SEAT WITH INTEGRATED LIFE VEST

FIELD OF THE INVENTION

Aircraft passenger seats with life vests are known generally and in civil aviation in a multiplicity of embodiments. In the case of conventional aircraft passenger seats, the life vest serving as lifesaving equipment in an emergency splashdown is usually kept in a life vest container located beneath the aircraft seat (see, e.g., U.S. Pat. No. 3,623,683). The life vest is folded in the form of a cushion, and is inserted into the life vest pouch used to accommodate the life vest.

In conventional storage compartments for conventional aircraft passenger seats, the life vest can to some extent be accessed only with some difficulty. This difficulty can be a disadvantage in emergency situations. Errors are also possible in an emergency. It is against such errors that the life vest is now in effect provided for seat occupants. Since the rescue systems in use in the form of life vests are provided with expiration dates for verification or renewal, maintenance operations are possible only occasionally for examining personnel because of the "hidden" location of the life vests. In addition, separately located life vests increase the takeoff weight of aircraft, and this reduces the profitable useful load to be transported.

U.S. Pat. No. 4,619,623 descloses an aircraft passenger seat with storage compartment for a life vest in a box-like recess in the back rest. The life vest is removed from the recess after the opening of a cover at the top of the back rest. The cover is sealed by adhesive sealing strips. To remove the life vest, the occupant of the seat must leave the seat, at least temporarily. This movement necessarily involving opening of the safety belt and is disadvantageous to safety. To better recognize and to ease handling of the cover of the recess, this cover is provided with a pull strap. However the pull strap is not in the immediate field of view of the occupant of the seat, but rather is in the field of view of the occupant of the seat immediately behind the seat housing the life vest. Thus, it is not clear which life vest belongs to which seat occupant. The latter situation creates the likelihood of confusion, which confusion can make dealing with dangerous situations significantly more difficult in an emergency.

GB-A-2 026 853 discloses a seat, preferably one used in watercraft, with a life vest which is an integral part of the padding of the seating element and a part of the back rest surface. It does not prevent the necessity of the seat occupant leaving this seat temporarily in an emergency to retrieve the life vest, something which entails the safety risks referred to previously.

U.S. Pat. No. 5,342,109 discloses a generic aircraft passenger seat in which the life vest is itself a padding element for the back rest. As an integral part of the back rest the life vest may be removed from an appropriate recess. In this instance also, the occupant of the aircraft passenger seat must leave his seat to be able to remove the life vest assigned to him. Once the life vest has been positioned among the other padding elements of the back rest, it is covered by an upwardly folding cloth covering sheet which may be fastened to the other cover elements of the back rest by adhesive sealing strips. The conventional life vest is in form similar to a float of solid material. The service weight of the life vest is thus correspondingly high.

SUMMARY OF THE INVENTION

Objects of the present invention are to improve aircraft passenger seats so that the life vests are more readily accessible, errors in the use of life vests are prevented, and reduction in weight is achieved.

The life vest is integrated with the padding element of the leg support and is folded to resemble a cushion. It is introduced into the recess in the leg support padded element. The leg support padding that would otherwise be provided is replaced by the folded life vest. Such replacement achieves reduction in weight in comparison to the conventional solutions, and provides the possibility of higher useful loads.

Since the life vest is introduced into the leg support as an integral component, immediate accessibility of the life vest by the occupant of the seat in the event of an emergency is ensured. The seat occupant can gain access to the life vest simply by spreading his legs, without having to leave his seat, and remove the life vest immediately without inconveniencing the persons near him. In addition, the passenger in question can use the life vest assigned to him quickly and without error in an emergency. In view of the ease of accessibility, inspection of a particular life vest is made easy for examining personnel. The solution of the present invention is also advantageous in that, in the case of aircraft with very cramped cabin seating conditions, every aircraft a passenger seat may be equipped with a life vest of its own, where there would otherwise be no room. Life vests cannot be kept in a central location due to difficulty of access. The last named circumstance occurs in the sphere of amateur aviation.

In a preferred embodiment of the aircraft passenger seat of the present invention, the life vest may be mounted in a recess in the padding element and may be covered by a covering element as an integral part of the padding element or may be introduced without a cover into the padding element. The cover can ensure flush sealing with the other parts of the padding element and so serves to increase seating comfort. In addition, a suitable cover protects the life vest from damage, so that the vest may, if desired, be mounted in the padding element. Even without a cover, the flexibility of the life vest ensures at least to some extent the padding property of the padding element into which the life vest is introduced, so that reasonable seating comfort is achieved.

In an effort to conserve space, the life vest is preferably folded like a cushion, removable either by itself or together with its protective case from the recess in the padding element. For this purpose the life vest is more or less rectangular in shape, and fits precisely in the recess.

In another preferred embodiment of the aircraft passenger seat of the present invention, the cover of the padding element is provided with a pull strap for opening. The cover is hinge-connected to the remaining padding element so that after opening the life vest faces the occupant of the seat to provide immediate access to the vest. Accordingly, the occupant of the seat swings the cover away from himself and is not hampered by the cover in the area of access to the life vest.

If the life vest is part of the leg support, it may also be rapidly accessed with the passenger suitably restrained in the aircraft passenger seat by the belt restraint system.

In another preferred embodiment of the aircraft passenger seat of the present invention, the leg support is divided into at least two parts by the padding elements. The life vest is mounted either in the padding element facing toward or facing away from the free end of the leg support or the foot rest of the seat.

For the sake of better identification of the life vest, the cover may be designed to be at least partly transparent or may be provided with marking. For the sake of permanent use, the cover for the life vest may be resealed, in particular by means of adhesive strip fasteners, for example, fasteners such as are marketed under the trade name "Velcro fasteners".

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 2a is a perspective view of a leg support with an integral life vest for the aircraft passenger seat of FIG. 1, according to a first embodiment of the present invention; and FIG. 2b is a perspective view of a leg support with an integral life vest for the aircraft passenger seat of FIG. 1 according to a second embodiment of the present invention.

DETAILED DESCRIPTION OF THE INVENTION

Figure 1:
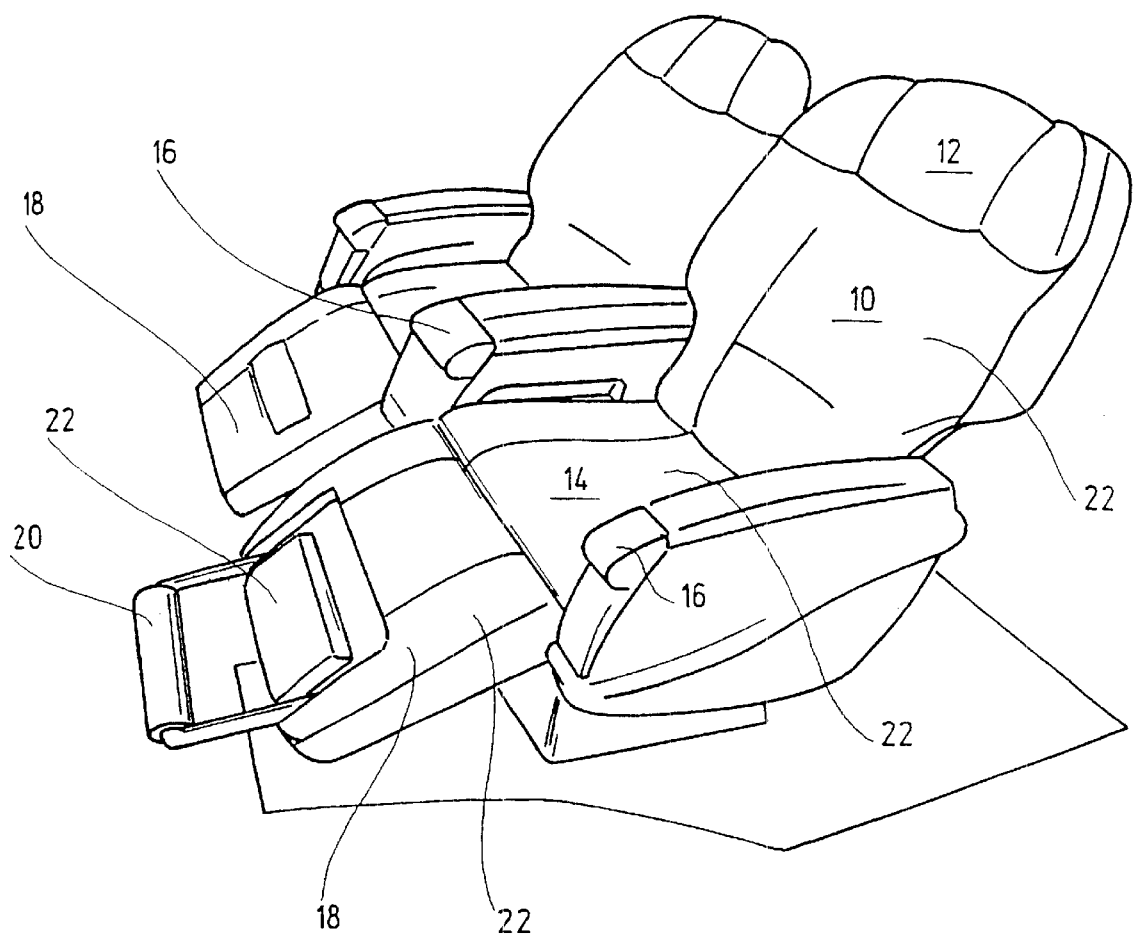
FIG. 1 is a perspective view of two aircraft passenger seats mounted side by side according to the present invention.

An aircraft passenger seat as illustrated in FIG. 1 has a back element 10 with integrated head rest component 12, a seat component 14 with two arm rests 16, and a hinge mounted leg support 18 with stirrup-like foot rest 20. Footrest 20 may be folded into and out of the leg support 18. The seat components and seat elements are provided with padding elements 22 designed to increase the seating comfort of the passenger. The aircraft passenger seat has a storage compartment for a life vest 24. The storage compartment is in the form of a padding element 22 of the leg support 18. As particularly illustrated by FIGS. 2a and 2b, the life vest 24 is introduced as an integral part of the pertinent padding element 22.

The embodiments illustrated in FIGS. 2a and 2b are provided with the same reference numbers and the relevant remarks apply to both embodiments or versions. The embodiments are explained to the extent that they differ substantially from each other.

The life vest 24 may be introduced into a recess 26 in the padding element 22 of the leg support 18. The recess 26 may be closed by a lid-like cover 28 as an integral part of the leg support padding element 22. Because of its flexibility, the life vest 24 guarantees the padding property of the padding element 22 into which the life vest is introduced. Part of the leg rest padding element 22 is replaced by the life vest 24.

The life vest 24 is folded as a sort of cushion. Together with its protective case, the life vest fits precisely in the recess 26 in the padding element 22. The recess 26 is more or less rectangular in shape for this purpose.

As is shown by FIGS. 2a and 2b, the particular cover 28 of the padding element 22 is provided with a pull strap 30 for opening. The direction of opening by pull strap 30 is indicated by an arrow 32 in FIGS. 2a and 2b. The cover 28 is pivotably connected to the remaining portion of padding element 22 of the leg support 18 and may be pivoted counterclockwise as viewed in the line of sight in the illustrations. In this way, after opening cover 28, the life vest 24 is freed and is exposed directly opposite the seat occupant so that it may be immediately grasped by such occupant.

In an embodiment not shown, the padding element 22 with the integrated life vest 24 may be part of the seating component 14 or the related seat bottom. In the embodiments illustrated, the leg support 18 is divided by padding elements 22 more or less in two parts as viewed longitudinally. The life vest 24 may either be mounted in the padding element 22 facing the free end of the leg support 18 or the foot rest 20 (FIG. 2b), or conversely mounted facing away or remote from the free end of leg support 18 or the foot rest 20 (FIG. 2a ).

In an embodiment not shown, the cover 28 may, for the sake of improved identification of the life vest 24, be at least partly transparent or marked. The cover 28 for the life vest 24 is preferably resealable, for example, by detachable adhesive strip fasteners (not shown in detail).

In the aircraft passenger seat of the present invention, the life vest 24 may be integrated with the padding of the aircraft passenger seat by substitution of a padding element 22, and may be held in its position inside the aircraft passenger seat by the padding element covering in the form of cover 28. The cover 28 may, however, be in the form of a solid top or the like of controllable flexibility. The pertinent solution is also suitable for passengers whose apparel and physical proportions would not permit the customary positioning of the life vest for the seat involved. The present invention creates integration of a life vest 24 provided for emergency situations with an aircraft passenger seat, without sacrifice of comfort or increase in weight. The life vest 24 may be grasped quickly and without mistake, and can be used immediately by the occupant of the seat or passenger in an emergency. If the life vest 24 is integrated with the leg support 18, the occupant of the seat can gain immediate access to the life vest 24 by simply spreading his legs without interfering with people in his immediate vicinity, so that safe removal in an emergency is provided.

While various embodiments have been chosen to illustrate the invention, it will be understood by those skilled in the art that various changes and modifications can be made therein without departing from the scope of the invention as defined in the appended claims.

What is claimed is:

1. An aircraft passenger seat comprising:

a back support with back comfort padding;

a seat support with seat comfort padding coupled to the back support;

a leg support with leg comfort padding coupled to the seat support; and a life vest mounted in a storage compartment recess in said leg comfort padding and integrated into said leg comfort padding, said life vest facing an occupant of the seat to be accessible to the occupant and being folded as a cushion.

2. An aircraft passenger seat according to claim 1, wherein a cover extends over said recess and said life vest.

3. An aircraft passenger sear according to claim 2 wherein said cover comprises a pull strap for opening, and is pivotally coupled remaining parts of said leg comfort padding.

4. An aircraft passenger seat according to claim 3 wherein said leg support comprises first and second parts with said leg comfort padding including first and second paddings, respectively, said first part and said first padding being a adjacent said seat support, said second part and said second padding being adjacent a free end of said leg support and being remote from said seat support.

5. An aircraft passenger seat according to claim 4 wherein said life vest is mounted in said first padding.

6. An aircraft passenger seat according to claim 4 wherein said life vest is mounted in said second padding.

7. An aircraft passenger seat according to claim 4 wherein said cover is coupled to said leg comfort padding by resealable adhesive strip fasteners.

8. An aircraft passenger seat according to claim 2 wherein said cover is at least partially transparent.

9. An aircraft passenger seat according to claim 2 wherein said cover is provided with a life vest identification marking.

10. An aircraft passenger seat according to claim 1 wherein said recess and said life vest are uncovered.

11. An aircraft passenger seat according to claim 1 wherein said life vest is flexible to provide at least a part of the padding property of said leg comfort padding.

12. An aircraft passenger seat according to claim 4 wherein said life vest is folded in a rectangular configuration when mounted in said recess.

* * * * *